United States Patent
Perron et al.

(10) Patent No.: US 7,814,183 B2
(45) Date of Patent: Oct. 12, 2010

(54) CONFIGURATION METHOD FOR DEVICE WITH VIRTUAL CONFIGURATORS

(75) Inventors: Laura Perron, Milan (IT); Danilo Bernasconi, Varese (IT); Enrico Valtolina, Milan (IT)

(73) Assignee: BTICINO S.p.A., Milan (IT)

( * ) Notice: Subject to any disclaimer, the term of this patent is extended or adjusted under 35 U.S.C. 154(b) by 89 days.

(21) Appl. No.: 12/084,001

(22) PCT Filed: Nov. 27, 2006

(86) PCT No.: PCT/EP2006/011388

§ 371 (c)(1),
(2), (4) Date: Jun. 12, 2008

(87) PCT Pub. No.: WO2007/060013

PCT Pub. Date: May 31, 2007

(65) Prior Publication Data

US 2009/0132068 A1    May 21, 2009

(30) Foreign Application Priority Data

Nov. 28, 2005   (IT) .......................... MI2005A2268

(51) Int. Cl.
*G06F 15/16* (2006.01)
*G06F 12/00* (2006.01)

(52) U.S. Cl. ...................................... 709/220; 709/221
(58) Field of Classification Search ................. 709/220, 709/221, 223–229
See application file for complete search history.

(56) References Cited

U.S. PATENT DOCUMENTS

| | | | |
|---|---|---|---|
| 6,741,885 B1 * | 5/2004 | Park et al. .................... | 600/509 |
| 2002/0147027 A1 * | 10/2002 | Alford et al. ................. | 455/557 |
| 2003/0050008 A1 | 3/2003 | Patterson | |
| 2003/0086111 A1 | 5/2003 | Akiyoshi | |
| 2004/0095897 A1 * | 5/2004 | Vafaei ......................... | 370/254 |
| 2004/0249925 A1 * | 12/2004 | Jeon et al. .................... | 709/223 |
| 2005/0040249 A1 * | 2/2005 | Wacker et al. ................ | 236/51 |
| 2005/0172118 A1 | 8/2005 | Nasu | |
| 2005/0227771 A1 * | 10/2005 | Nelson et al. ................. | 463/43 |

FOREIGN PATENT DOCUMENTS

| | | |
|---|---|---|
| DE | 278 054 A1 | 4/1990 |
| DE | 2178 053 A1 | 4/1990 |
| EP | 0 947 192 A1 | 10/1999 |
| EP | 1 136 062 A1 | 9/2001 |
| EP | 1 541 023 A2 | 6/2005 |
| WO | WO 96/23413 A | 8/1996 |

* cited by examiner

*Primary Examiner*—Zarni Maung
(74) *Attorney, Agent, or Firm*—Hedman & Costigan, P.C.; James V. Costigan

(57) ABSTRACT

A configuration method for an SCS system, comprising a two-wire SCS bus (11), to which are connected configurable devices (16), such as actuators, controls, dimmers, etc., realized by means of virtual configurators stored in a memory inside the devices (16) themselves; the installer is therefore able to choose whether to configure an SCS installation using current physical configurators, or using the new method with the help of a PDA, a Personal Computer (10) or similar equipment.

10 Claims, 1 Drawing Sheet

CONFIGURATION METHOD FOR DEVICE WITH VIRTUAL CONFIGURATORS

Figure 1:
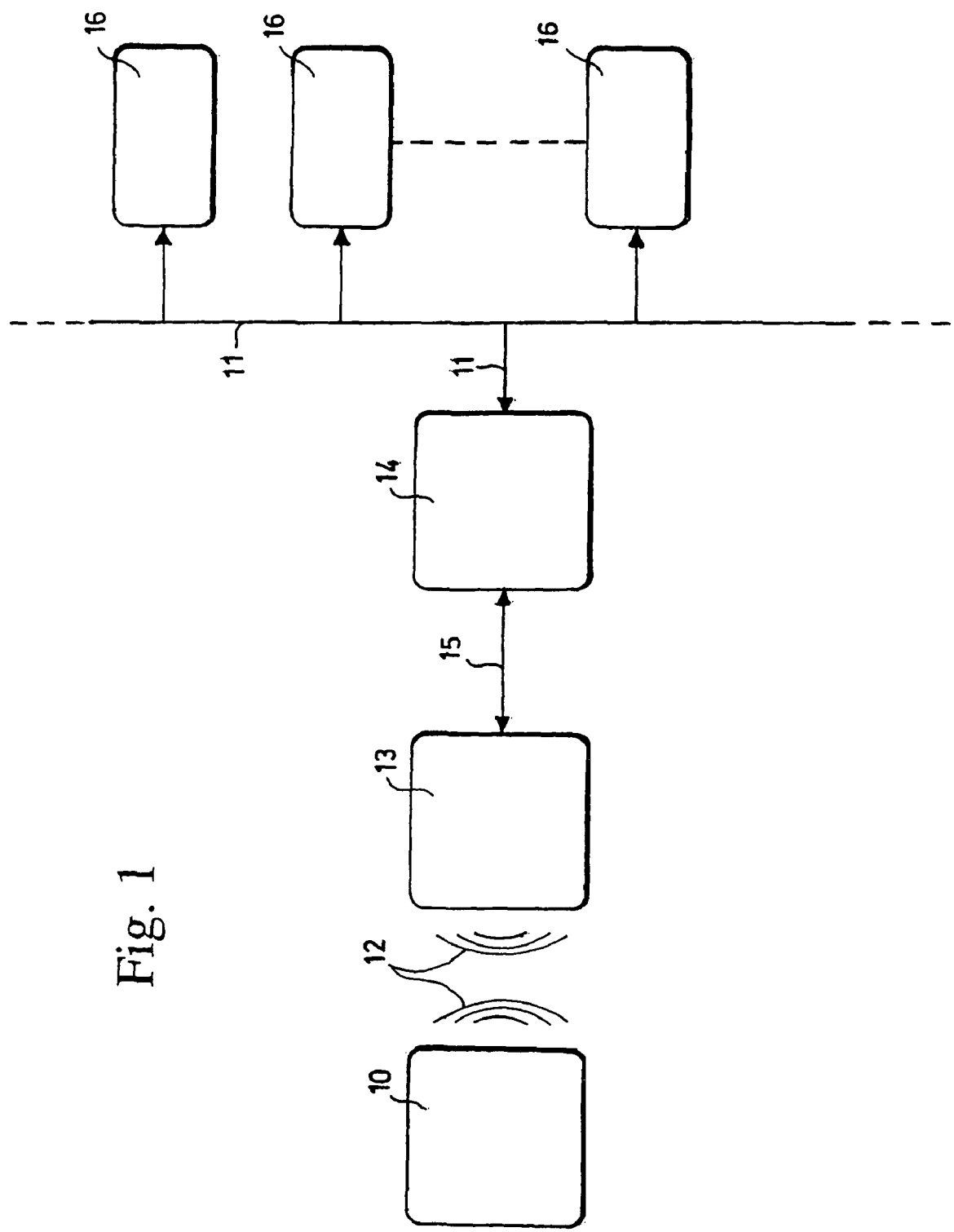

The present invention relates to a configuration method for devices such as actuators, controls, dimmers, etc., with virtual configurators.

In current domotic devices and systems, configuration is often provided by command devices, performed by a set of actuator devices through a self-learning message stage.

As an example, a typical schematic configuration of a self-learning domotic system comprises a command device conceived to transmit specific programming messages to devices such as actuators, controls, dimmers, etc., destined to control determined loads such as the lighting in a room or a complete apartment, and/or activating systems of the type used to open and close rolling shutters.

This procedure consists of setting the actuator devices in programming mode, for example, through prolonged pressure on a determined key followed by the successive transmission of the message to be memorised by the command device.

A signal LED diode can be used to indicate the programming status (for example: switch-on) and the confirmation that the command has been memorised (for example: switch-off).

This operation must be repeated for each command message programming procedure on each actuator device and each actuator device is able to store several command messages.

If the key is pressed for a longer period, this can zero-set the memory of the programmed controls, once again indicated by a signal LED diode, such as a temporary flashing action, for example.

At present, domotic systems exist that are based on electric buses, which however generally assign addresses by means of configuration numeric selectors, microswitches or bonds.

Basically in this case, a command device is connected to an electric bus, to which the actuator devices are also connected; the controls send the activating signals through a bus to the actuators, which are also directly connected to the respective loads such as lighting and/or electric motors.

The command device and the actuator devices also possess numeric selectors that can be used to assign addresses.

The aim of the present invention therefore, is to propose a new SCS system configuration method, able to integrate with systems based on two wire SCS buses, that will permit the configuration of devices (actuators, controls, etc.), through virtual configuration stored in a memory inside the device itself.

Another aim of the present invention is to create a configuration method for devices, such as actuators, controls, dimmers, etc., with virtual configurators, that allows the installer to choose between configuring an SCS installation using physical configurators, or by using a PDA or a PC or similar equipment.

Yet another aim of the present invention is to provide a configuration method for devices with virtual configurators, that are easy to install and use, and that are also efficient, safe and reliable.

These and other aims, according to the present invention, are achieved by providing a new configuration method for devices with virtual configurators, according to the appended claim 1; the subordinate claims contain detailed technical characteristics of the invention.

Advantageously, the new method for configuration devices such as actuators, controls, dimmers, etc., of a domotic system bus, in "virtual" mode, can be realised using a PDA or a PC or similar equipment, by pressing appropriate keys on the device to be configured, or by entering the device address of the device to be configured on the PDA or PC.

This provides remarkable mobility levels within the installation; and above all it is also possible to reconfigure devices which are not accessible, simply by knowing the address. It is also possible to perform diagnostics of the whole installations through a PDA, PC or similar equipment.

Further characteristics and advantages of the configuration method for devices with virtual configurators, according to the present invention, will be made more apparent in the following description, provided as an example, but by no means limitative, with reference to an embodiment and the appended drawing (FIG. 1) which shows a block diagram outline of said configuration method, according to the invention.

In the aforesaid FIGURE that demonstrates the technical characteristics of the configuration system, according to the invention, the numeral 10 refers to a PDA or a Personal Computer (PC), that is connected to a two wire SCS bus 11, through a radio frequency connection 12, such as WiFi, for example; said solution also requires the use of a web server 14 such as OPEN-SCS gateway, connected to an Ethernet line 15, in turn equipped with Wi-Fi a receiver/transmitter (access point) 13.

In order to set up the virtual configuration, the installer has a case containing a PDA or a PC 10, web server 14 and a Wi-Fi access point 13; the PDA seems to be the best instrument for the configuration operations because it is handy to use and easily portable, since it has remarkable mobility inside the installation with an extremely good signal coverage (80 meters in obstruction-free space). However, an alternative method is to use a PC instead of the PDA to perform virtual configuration, with the same function and similar software.

User interfaces other than PDA or PC can also be used. The virtual configuration method that can be applied according to the invention is as follows (it should be noted that a configuration method using a PDA has been presented as an example, even though the function can be performed in the same manner by a PC or another similar user interface).

After connecting all devices 16, such as actuators, controls, dimmers, etc., and after connecting the PDA 10 to the two wire SCS bus 11, the installer has only to connect the installation to the main power supply, and the installation configuration stage can be started using the PDA 10.

Practically speaking, the installer simply presses a key on the device 16 to be configured, and following this a message will appear on the PDA 10.

The software present on the PDA 10 possesses a database, containing the files of all the domotic devices 16 present inside a determined catalogue.

The installer is given the choice whether to use the guided configuration method, or whether he prefers a general configuration method.

In the first case, the PDA 10 software recognises the device 16 which is being configured, because it is contained in the database, and therefore proposes guide instructions for configuration; for example, the seat of the configurators is displayed as it is presented on the device in question, thus confining the selection exclusively to the consented configurators.

In the second case, the device 16 is not yet contained in the product catalogue database, and therefore, the installer can follow a general configuration procedure where he is completely free to choose which configurators he prefers; in this situation, the installer is also given the possibility of adding the relevant device 16 to the database.

Once the configurators have been entered in the PDA 10, the installer confirms the operation.

At this point, the confirmation of the completed configuration will appear on the PDA 10, or an error signal will appear in the case where the entered configuration is incorrect, for example.

Once this stage has been completed, the installer can decide whether he will terminate the configuration stage or continue, and if this is the case, he must repeat the procedure described previously, pressing the key of the new device 16 to be configured.

Naturally, a control check on the physical configurators is made upstream, and if present, the whole procedure will be blocked with a message that appears on the PDA display.

This procedure can also be used to reconfigure devices 16, which have been previously configured using virtual configurators; in this case, when the key of the device 16 to be configured is pressed, the PDA 10 display will show a screen with the configuration to be modified, and the installer is able to enter the desired configuration on the PDA 10, confirming the procedure, and then he is able to continue as described previously.

The PDA 10 can also be used to request the configuration of a device 16 by pressing the appropriate key; the PDA 10 will display the configuration, specifying whether the configurators are physical or virtual.

In the case of devices 16 previously configured using virtual configurators, and therefore, addressable, reconfiguration can be performed by remote control and/or off-line; the installer can set up the configuration of an installation from his own office, save the configuration and use it when he needs to visit the installation in question.

In this case, the application program should permit installation configuration saving in standard format (such as an .xml file), storable in mass memory, such as compact flash or secure digital modules, that can also be left at the customer's location, and which make future interventions on the installation by installers, FTC, and technical assistance, much more convenient. Installation configuration could also be saved on a determined Internet gateway.

Lastly, as mentioned before, the PDA 10 software can also be used to detect the configuration perform diagnostics on an installation already running; for example, it is possible to scan the whole installation to detect any possible faulty devices 16.

In this way, wiring is identical for any type of installation, and the function logic (zoned function, direct command of a single device, direct command of all devices in the same environment, logic connections between devices belonging to different environments, direct command of all devices belonging to a same group, direct command of all devices) is established through the configuration of the various devices 16 identified, to which specific operating methods and/or functions to be performed are assigned. This can be varied at any time without physical intervention on the wiring.

Moreover, in the specific case of virtual configuration, a device can be reconfigured without having to access the configurators (an operation which, in the case of built-in devices for example, necessarily involves opening the device casing), and without having to shut off and reconnect the power supply to the system.

The characteristics of the configuration method of devices with virtual configurators, object of the present invention, have been made clear by the aforesaid description, as have the apparent advantages. Lastly, it is obvious that numerous variants can be applied to the configuration method in question, while remaining within the innovative context of the invention, and it is also obvious that in the practical embodiment of the invention, all materials, shapes and sizes of the components illustrated can be of any type according to necessity, and can be replaced by others that are technically equivalent.

What is claimed is:

1. Configuration method for devices (16) on a system control service (SCS) installation, comprising at least one two wire bus (11) to which the configurable devices (16) are connected, the method being defined by creating and varying the logic function of the devices (16), without physical intervention on the wiring involving or opening the device (16) casing, where the creating and varying of the function logic of the devices is carried out by means of virtual configurators, which are addressable and which are stored in a memory inside the configurable devices (16), the method being further defined by identifying the configurable devices through their configuration, the configurable devices (16) being assigned specific operational methods and/or functions to be performed, the method being further defined by allowing the reconfiguration of the configurable devices (16) without having to access the physical configurators (16) involving opening the device casing, and without having to shut off the power supply to the system control service (SCS) installation.

2. Configuration method according to claim 1, characterised in that said configuration method can be performed using a PDA or a PC (10), by pressing appropriate keys on the device (16) to be configured, or by entering the address of the device (16) to be configured in the PDA or PC (10).

3. Configuration method according to claim 2, characterised in that it is possible to reconfigure inaccessible devices (16) where the address is identifiable, and to perform diagnostics on, the whole installation through said PDA or PC (10).

4. Configuration method according to claim 2, characterised in that said PDA or PC (10) is connected to the two wire bus (11) of the SCS installation (11), through a radio frequency connection (12), said two wire bus (11) being connected to at least a web server (14), such as OPEN-SCS gateway, in turn connected to an Ethernet line (15), equipped with a Wi-Fi receiver/transmitter (13).

5. Configuration method according to claim 2, characterised in that said PDA or PC (10) is equipped with application software, comprising a database, containing the files of the devices (16) present in a specific catalogue.

6. Configuration method according to claim 5, characterised in that said software recognizes the device (16) undergoing configuration, since it is present in its database, and proposes a guide for device configuration.

7. Configuration method according to claim 5, characterised in that said software permits a generic configuration procedure, permitting the installer to choose which configurator he prefers, and if necessary, to add the identified device (16) to the database.

8. Configuration method according to claim 1, characterised in that said devices (16) can be reconfigured using virtual configurators, by entering the desired configuration in a PDA or PC (10), said reconfiguration also being possible by remote control and/or off-line, and storable in mass memory and/or Internet gateways.

9. Configuration method according to claim 5, characterised in that said PDA or PC (10) software can be used to perform diagnostics on an installation already running, to scan the installation and to detect any possible faulty devices (16).

10. Configuration method for devices (16) on a system control service (SCS) installation, comprising at least one two wire bus (11) to which the configurable devices (16) are connected, the method being defined by creating and varying the logic function of the devices (16), without physical intervention on the wiring or opening the device (16) casing, where the creating and varying of the function logic of the devices is carried out by means of virtual configurators, which are addressable and which are stored in a memory inside the configurable devices (16), the method being further defined by identifying the configurable devices through their configuration, the configurable devices (16) being assigned specific operational methods and/or functions to be performed, the method being further defined by allowing the reconfiguration of the configurable devices (16) by said virtual configurators without having to access the physical configurators (16) involving opening the device casing, by using virtual configurators and without having to shut off the power supply to the system control service (SCS) installation wherein the step of creating and varying the function logic of the devices (16) comprises at least one selected from the group of devices which define a zoned function, directly command a single device, directly command all devices in the same environment, directly command all devices belonging to a same group, directly command all devices and define logic connections between devices belonging to different environments.

\* \* \* \* \*